Figure 1:
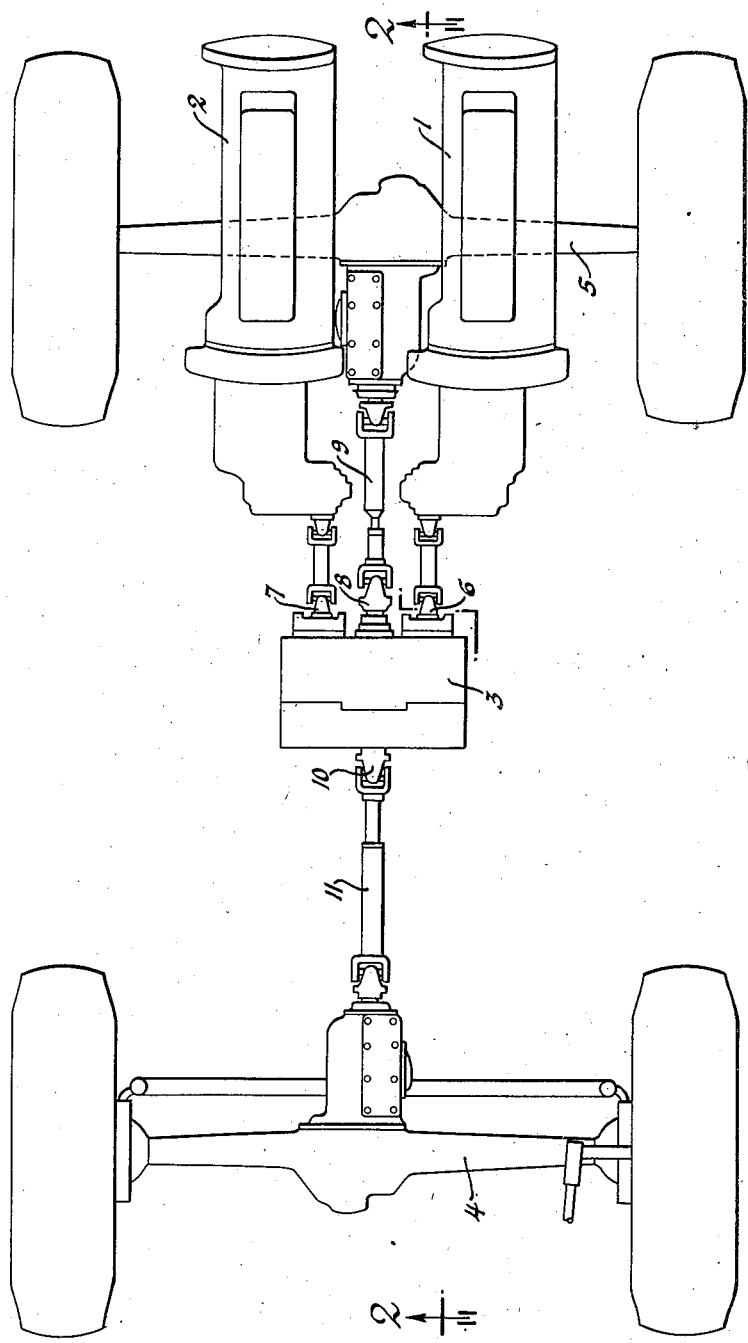

June 6, 1944.　　A. HILLCOAT ET AL　　2,350,459
DOUBLE REDUCTION AXLE
Filed Nov. 30, 1942　　4 Sheets-Sheet 2

Inventors
Alexander Hillcoat &
John Bain Griffith
By Blackmor, Spencer & Clint
Attorneys

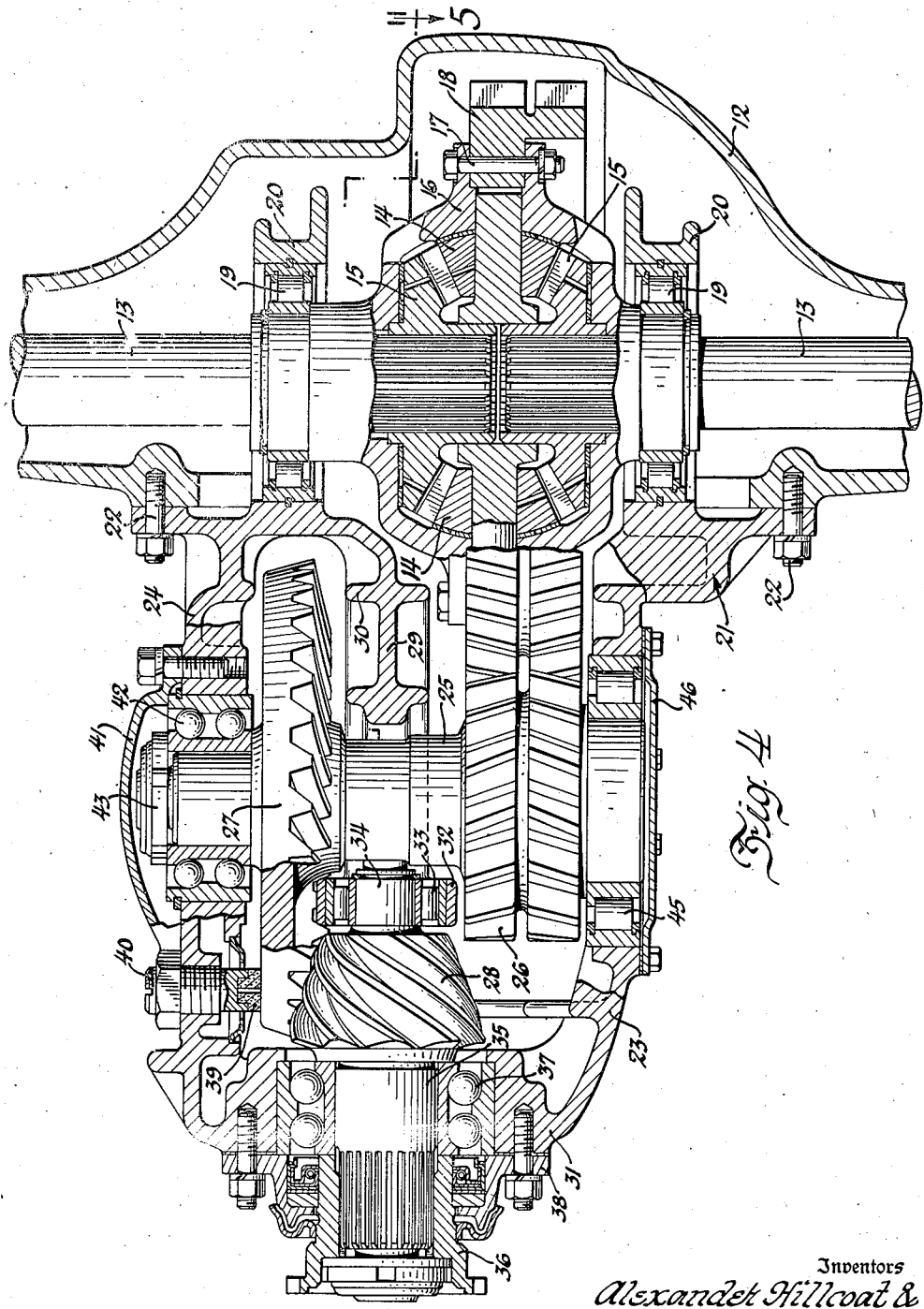

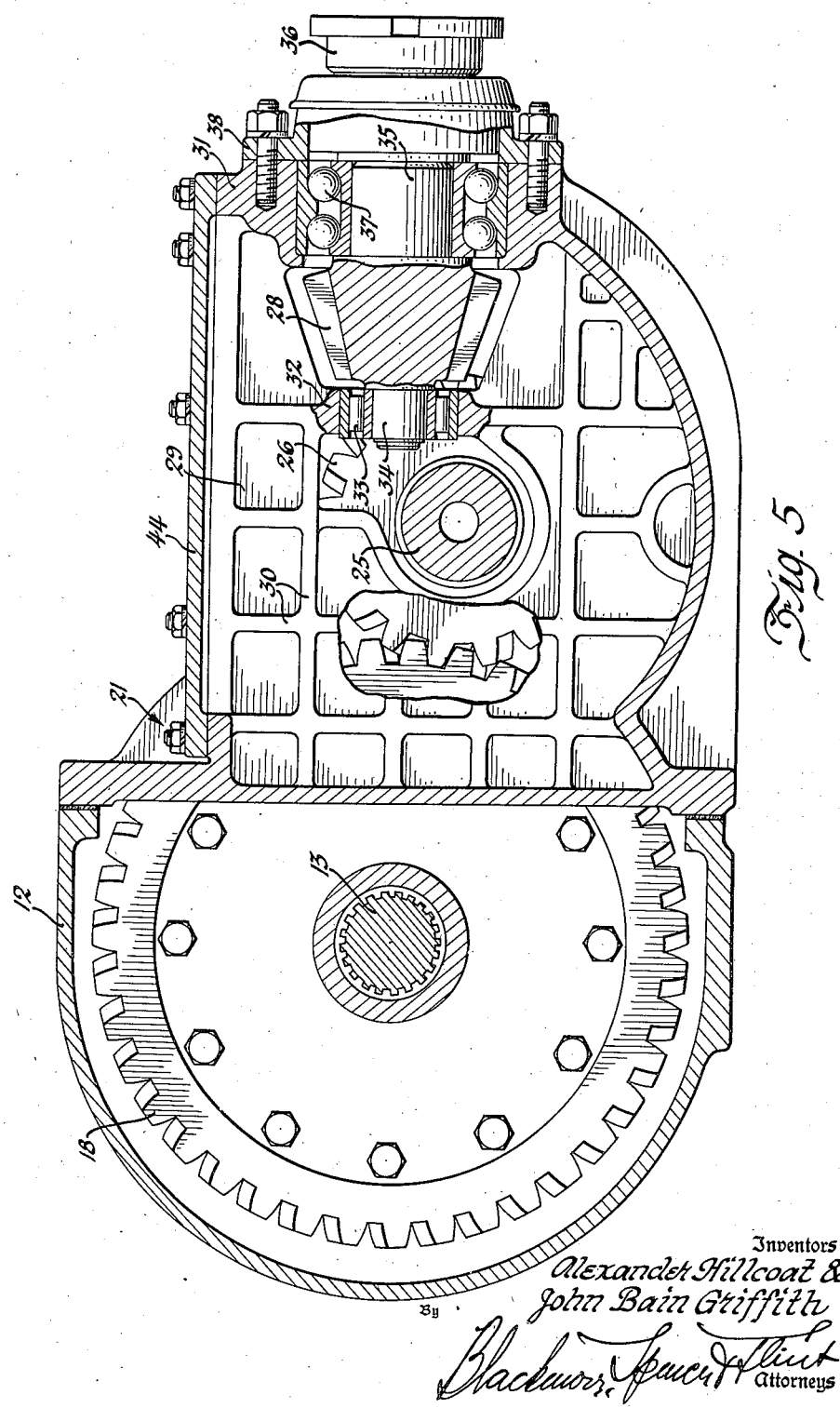

Patented June 6, 1944

2,350,459

UNITED STATES PATENT OFFICE 2,350,459

DOUBLE REDUCTION AXLE

Alexander Hillcoat and John Bain Griffith, Detroit, Mich., assignors to General Motors Corporation, Detroit, Mich., a corporation of Delaware Application November 30, 1942, Serial No. 467,436

8 Claims. (Cl. 74—314)

This invention relates to motor vehicles and especially heavy duty land vehicles with multiple drive axles. For light operation on hard pavement a single small engine driving one set of road wheels ordinarily is considered sufficient but for operation on soft ground requiring more power it is deemed best to provide two power plants and transmit the drive to all wheels. For certain installations involving two axle vehicles use has been made of a pair of conventional internal combustion engines having change speed transmissions and being arranged side by side and coupled through a common transfer case solidly with the trailing or rear axle and selectively with the front or steering axle. In addition to the change speed ratios available in the transmission boxes associated with the twin power plants the transfer case may be of the two speed variety and because of the heavy duty character of the vehicle the drive axle gearing preferably is of the double reduction type.

In the development of a vehicle of this type a special effort has been made to incorporate sturdy units of proven design wherever possible so that many parts can be employed which are either already available or can be manufactured quickly with existing equipment. With special reference to the drive gearing the design of the front axle can be similar or substantially like that of the rear axle with most of the parts interchangeable and all easily accessible for inspection and replacement. Light weight and compactness are important factors resulting from careful structural design of the gear case and the use of efficient gear tooth formations including herringbone gears between parallel shafts and hypoid gearing for the angularly disposed shafts. With hypoid gearing increased strength and life are obtained over conventional bevel gears of equal diameter. Furthermore, a savings in overall length of the assembly with less strain and bearing load can be effected by mounting the pinion shaft on both sides of the driving teeth with a main bearing for the shaft proper in the end wall of the case and a second bearing for a terminal pinion stub in a stiffening wall of the case centrally disposed between a pair of gears on an intermediate shaft.

The intermediate shaft is mounted at opposite ends in the two side walls of the case and passes through an axially aligned opening in the central wall or web. The latter longitudinally divides the interior of the case and in the assembly of the parts the hypoid ring gear is introduced through an opening in the top on one side of the central web and the intermediate shaft is introduced axially through the ring gear and central wall from an opening in the far side wall of the case and which opening is large enough to permit entrance of the herringbone drive gear on the other side of the central web. The bearings in the opposite side walls fasten the intermediate shaft against axial displacement while the bearings for the differential cage axially float the cage and enable the cage to center itself by engagement of its herringbone ring gear with the herringbone drive gear on the intermediate shaft.

The intermediate shaft is offset vertically from a horizontal plane containing the axes of the differential and the driving pinion. This contributes further to compactness and results from the fact that hypoid gears have non-intersecting axes. As a requisite of correctly designed hypoid gears, the offset must be arranged in relation to the driving direction and, therefore, the offset is above the front axle and below the rear axle with a left spiral hypoid in the front axle and a right spiral hypoid in the rear axle in case both pinions are driven counterclockwise for forward travel. With the pinions in the same horizontal plane of both axle differentials and with the transfer case also mounted in this plane, a substantially straight line drive is had with minimum angularity in the universally jointed propeller shafts.

Figure 2:
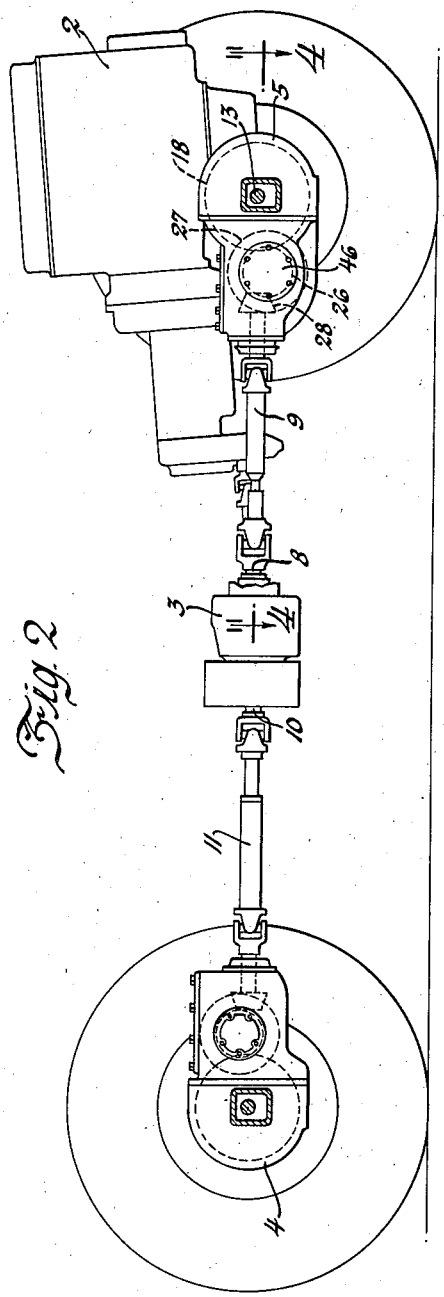
Figure 3:
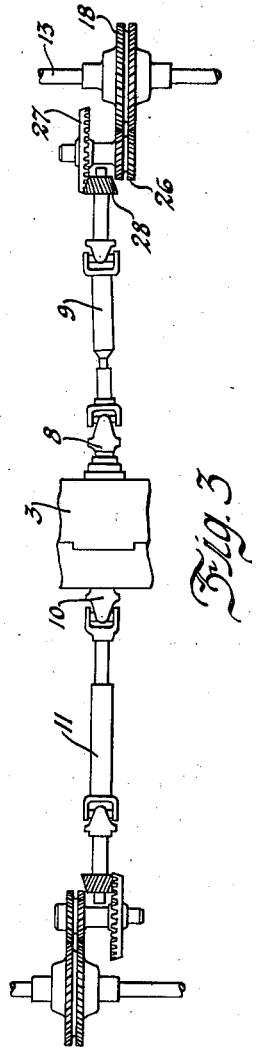

For reference to the structure in greater detail note should be taken of the accompanying drawings wherein Figure 1 is a top plan view outlining the relation of the vehicle drive components; Figure 2 is a view in side elevation as on line 2—2 of Figure 1; Figure 3 is a plan view fragment with the casings omitted to show the gearing relations in the front and rear axles; Figure 4 is a horizontal sectional view on a large scale through the rear drive axle and may be considered as taken on line 4—4 of Figure 2 and Figure 5 is a vertical sectional view taken on line 5—5 of Figure 4.

Figure 1 shows a pair of rearwardly mounted power plants 1 and 2 drive connected through a transfer case or power divider 3 with front and rear axles 4 and 5, respectively. Each power plant includes a conventional internal combustion engine and a variable speed transmission preferably of a well known automatic type. Each transmission case includes a lateral extension projecting downwardly and inwardly and containing a train of gears to bring its power output shaft in substantially coaxial alignment with an input shaft of the transfer case 3 to which connection is made by a short length universally jointed drive shaft. The transfer case input shafts are indicated by the numerals 6 and 7, respectively. Power is transmitted from the input shafts to the central output shaft 8 coupled by a universally jointed propeller shaft 9 with the gear train of the rear axle 5 to drive the road wheels on opposite ends of the axle. For the selective transmission of power to the front steerable wheels on opposite ends of the axle 4 a slidable jaw clutch may be contained within the transfer case for coupling the output shaft 8 with an axially aligned forwardly projecting shaft 10 driving the universally jointed propeller shaft 11 which leads to the gear train of the front axle 4. The drive in the transfer case may be through intermeshing gears carried by the shafts 6, 7 and 8, respectively.

For a two speed drive arrangement the transfer case shaft 8 may have fixed thereon a pair of spaced gears of different size, each meshing with mating gears rotatably mounted on the input shafts 6 and 7. Jaw clutch sliders splined on the input shafts 6 and 7 between the gears of the sets may be shifted from an intermediate neutral position into coupled relation selectively with the adjacent gears. By reason thereof either or both engines can be selectively coupled in either high or low speed settings of the transfer case gearing and thus augment the gear ratios of the primary variable speed transmissions associated with the power plants 1 and 2. Control of the several clutches in the transfer case is to be effected manually through suitable linkage leading from the operator's driving position.

The mounting of the transfer case should be such that the output shafts are substantially in the horizontal plane occupied by the front and rear axles and substantially coaxial with the axle driving pinions to minimize angularity in the universally jointed propeller shafts 9 and 11. Inasmuch as the shafts, when coupled together for four wheel drive operation, rotate in the same direction and because the pinion shafts project toward one another from adjacent sides of the axles, the hypoid gearing in the front and rear axles need to be spiraled in opposite hand in order that the drive thrusts will properly pass between the driving faces of the gear teeth. Thus is illustrated in Figure 3 a left spiral hypoid tooth formation as embodied in the front axle and a right spiral hypoid tooth formation in the rear axle inasmuch as rotation of both propeller shafts for forward vehicle travel is counterclockwise. Accordingly as seen in Figure 2 the axis of the hypoid ring gear is vertically offset above the horizontal plane containing the axes of the differential and drive pinion while in the rear axle the axis of the hypoid ring gear is below this plane. Otherwise the corresponding parts in the front and rear axle assemblies are alike and largely interchangeable with one another. Accordingly and to simplify the specification only the detail structure of the rear driving axle will be elaborated upon.

In Figures 4 and 5 it will be seen that the axle housing 12 encloses a pair of drive axle sections 13—13 as well as the differential mechanism between the axle sections. As usual the mechanism includes differential gears 14 in mesh with the side gears 15 which have splined connection with the inner ends of the axle shaft sections 13—13. A two part cage 16 for the differential gearing is secured together by a series of studs 17 which also mount thereon a herringbone ring gear 18. Tubular extensions projecting from opposite sides of the cage 16 have secured thereto by snap rings the inner race rings of roller bearing assemblies 19 whose outer races are secured in supports 20. The roller bearings 19—19 rotatably support the cage and accommodate axial floating thereof for an automatic centering under the opposing thrusts imparted to the herringbone gear 18 during operation.

The cage supports 20 are carried by the gear supporting and enclosing case 21 which is detachably secured by a series of threaded studs 22 over an opening in the side vertical face of the axle housing 12. Mounted in the side walls 23 and 24 of the case 21 are the bearings for an intermediate shaft 25 having fixed thereon near one end the herringbone gear 26 in mesh with the gear 18 and having fixed thereon near its opposite end a hypoid ring gear 27 in mesh with a driving gear 28. In the space between the gears 26 and 27 the case has a longitudinally extending wall or web 29 having an opening therein axially aligned with the openings in the side walls 23 and 24 for the passage of the intermediate shaft 25. This central wall imparts considerable strength to the casing and for lightness in weight combined with strength its wall may be comparatively thin and provided on opposite faces with laterally projecting ribs 30 extending both vertically and horizontally in a grille pattern substantially as seen in Figure 5. The web 29 is cut away to provide a pocket near the front wall 31 of the case 21 to receive the drive pinion 28. Immediately adjacent the nose of the driving pinion the wall 29 is formed with the circular enlargement 32 to receive a roller bearing assembly 33 mounted on the stub or terminal shaft 34 near the apex of the pinion 28. Projecting in the opposite direction from the drive pinion is the pinion shaft proper indicated by the numeral 35, which is to be coupled by a splined collar 36 with the universally jointed propeller drive shaft. It has mounted thereon between the collar 36 and an end shoulder, the inner race of an annular double row ball bearing 37 whose outer race is secured in the end wall 31 of the case by a detachable cover 38 which also mounts the usual shaft wiper seal assembly. These parts are a subassembly with the drive pinion which can be inserted in or removed from the case through the end wall 31 and which carries with it the outboard bearing 33 normally fitted to the ring 32 on the central web. By reason of the straddle mounting of the drive pinion 28, driving strains on the parts are reduced and a shorter main bearing can be employed for the drive shaft 35.

To take thrust at the line of driving action between the gears 27 and 28 a bearing shoe 39 is employed to engage the rear face of the ring gear 27 adjacent its engagement with the drive pinion 28, the shoe being carried on the end of a threaded stud 40 adjustably mounted in the case side wall 24. This case side wall has a cover cap 41 secured thereto over the opening which receives the annular double row ball bearing 42 for the adjacent end of the intermediate shaft 25. It assists in locating the bearing axially and enables access to the fastening nut 43 which holds the inner bearing race on the end of the shaft.

Between the side wall 24 and the central wall 29 of the case the space containing the hypoid ring gear 27 is accessible from the top of the case through an opening normally closed by the removable cover plate 44. In assembling the parts the ring gear 27 is introduced through the top opening and the end of the intermediate shaft is fitted thereto and to its load supporting bearing 42 after having been introduced axially through the aligned openings in the central wall 29 and the far wall 23 of the case. The opening in the last mentioned wall is large enough not only to pass the shaft but also the herringbone drive gear 26 fixed on the shaft. After insertion of the intermediate shaft the annular roller bearing 45 is fitted to the end of the shaft and to the opening in the side wall and is held in place by a detachable cover plate 46. Thereafter the drive pinion and differential subassemblies can be installed and the gear support case is ready to be bolted on the axle housing. Thus assembly, as well as dismantling, is a simple procedure.

From the above description, it will be apparent that there is provided a practical, compact and sturdy arrangement which can be produced economically and without delay to meet the present urgent demand for heavy duty equipment.

We claim:

1. In a motor vehicle having a double reduction drive axle with hypoid drive gearing, including a pair of drive axle sections and a differential ring gear coaxial therewith, a hypoid drive pinion on an axis intersecting the differential ring gear axis, an intermediate shaft having its axis vertically offset from and in non-intersecting relation with the driving pinion axis, a pair of axially spaced gears carried by the intermediate shaft on opposite sides of the pinion axis, one of said gears meshing with the differential ring gear and the other gear being a hypoid ring gear meshing with said hypoid pinion, and a bearing for the hypoid pinion, located in the space between the gears on said intermediate shaft and between the intermediate shaft and said pinion.

2. In a double reduction axle drive, a differential ring gear and a hypoid drive pinion transversely offset from one another and on intersecting axes, an intermediate shaft having its axis offset from and in non-parallel non-intersecting relation with the axis of the drive pinion, a hypoid ring gear carried by said intermediate shaft on one side of and in mesh with said pinion and a driving gear carried by the intermediate shaft on the other side of the pinion and in mesh with the differential ring gear.

3. In a dual axle drive, a pair of double reduction axles, each having an axle ring gear, a hypoid drive pinion transversely offset from the ring gear and longitudinally spaced therefrom toward the other axle, and an intermediate shaft carrying a gear meshing with the ring gear and a hypoid gear meshing with said pinion, the axis of the intermediate shaft of one axle being above that of its pinion and the axis of the shaft of the other axle being below that of its pinion and the hypoid ring gears of the two axles being on opposite sides in relation to each other transversely of their respective pinions, and also being of opposite hand, and drive shafting operatively connected with both pinions for their rotation in the same direction simultaneously.

4. In a drive axle assembly, an axle housing enclosing the axle shafts and differential, a gear case detachably secured to the axle housing and supporting the differential and driving gears, an intermediate shaft supported at opposite ends in the case side walls, a hypoid ring gear mounted on said intermediate shaft, a hypoid driving pinion meshing with the ring gear on an axis non-parallel to and non-intersecting that of the intermediate shaft, pinion supporting shaft portions projecting oppositely from the ends of the hypoid pinion, a bearing support for one of said shaft portions in the end wall of the case and a bearing support for the other end shaft portion located within the case between the driving pinion and the said intermediate shaft.

5. In a drive axle assembly, a gear support case, an intermediate shaft having opposite ends mounted in the case side walls and carrying a pair of transversely spaced gears, a web interiorly of the case between said gears with a passage therethrough receiving said intermediate shaft, and a drive pinion meshing with one of said gears and having a pair of supporting shafts projecting oppositely therefrom with one shaft supported in the case end wall and the other shaft supported in said web.

6. For use in a drive axle assembly, a gear support case having a stiffening wall centrally of its two side walls, an intermediate shaft projecting through a passage in the central wall and carrying gears on opposite sides thereof, a removable cover plate for a top opening over the space between the central wall and a side wall for introduction through the opening of one of said gears, a bearing receiving opening in the last mentioned side wall for supporting one end of the intermediate shaft, a bearing opening in the other side wall for supporting the opposite end of said intermediate shaft, said opening being axially aligned with the passage in the central wall and the opening in the other side wall and of a size to permit axial introduction of the other of said gears and the intermediate shaft and a driving pinion engaging one of said gears and having a bearing support in said central wall.

7. In combination, a pair of drive axles to be driven in the same direction of rotation from shafts rotating in the same direction, a left spiral hypoid ring gear for the forward axle, a drive pinion therefor located to the right-hand side of the ring gear and on an axis below that of the ring gear, a right spiral hypoid pinion for the rear axle, a ring gear driven thereby and located on the right-hand side of its pinion and on an axis below that of said pinion.

8. In combination, a pair of drive axles to be driven in the same direction of rotation from shafts rotating in the same direction, drive pinions for each axle, a driven ring gear in mesh with one of said pinions and being positioned on one side of its pinion and on an axis below that of its pinion, a driven ring gear in mesh with the other of said pinions and being positioned on an axis above that of its pinion and on the side thereof opposite to that of the first mentioned ring gear in relation to its pinion, right spiral hypoid teeth carried by one ring gear and its pinion and left spiral hypoid teeth carried by the other ring gear and its pinion for forward drive of both axles through the convex driving tooth surfaces of their respective hypoid ring gears.

ALEXANDER HILLCOAT.
JOHN BAIN GRIFFITH.